June 11, 1940.                      J. J. GOUGH                    2,204,212
               HANDLE AND BASE CONSTRUCTION FOR AN ELECTRICAL APPLIANCE
                              Filed April 24, 1939
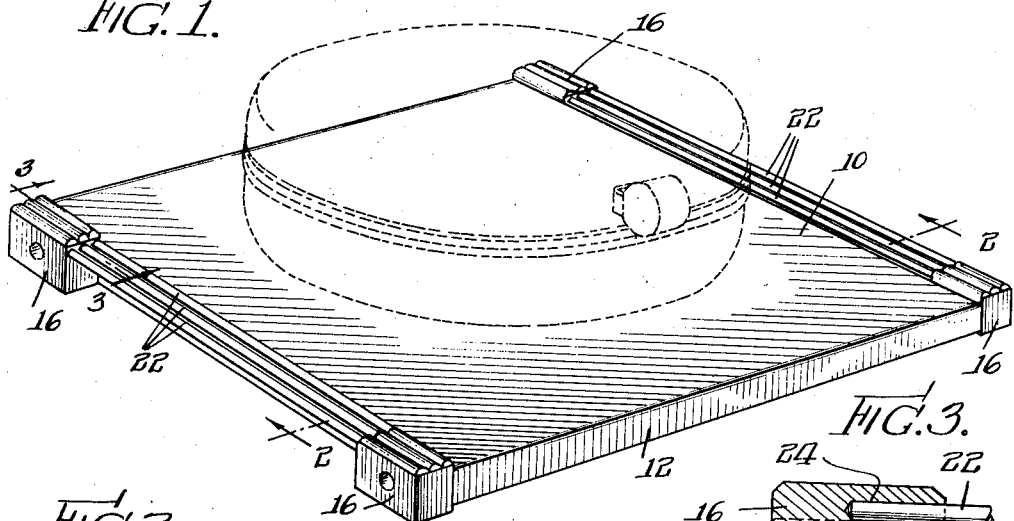
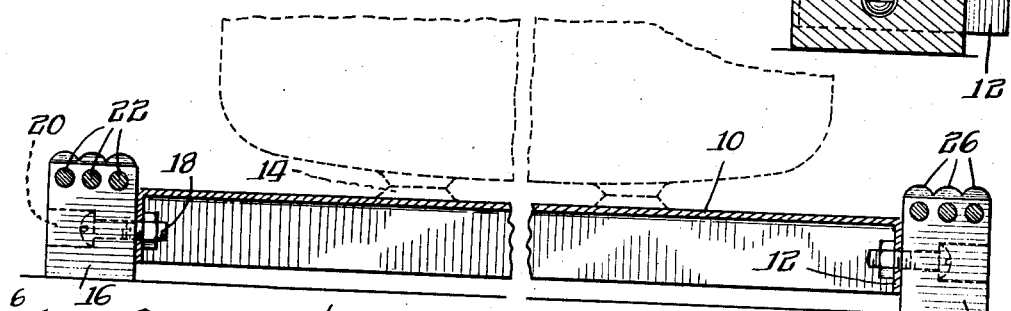
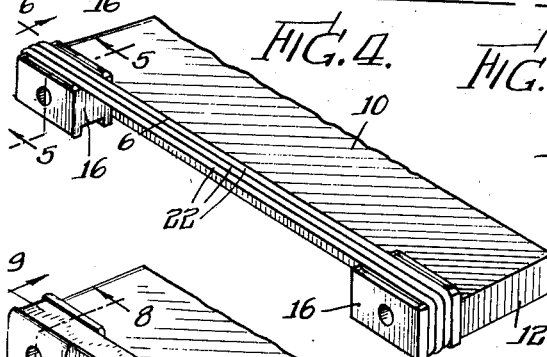
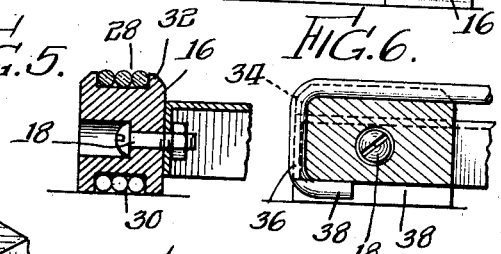
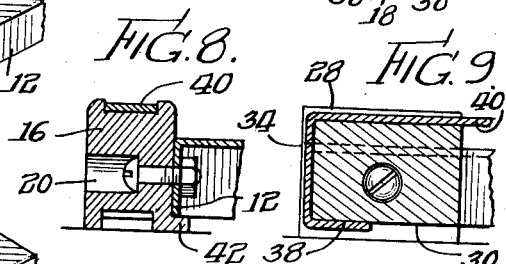
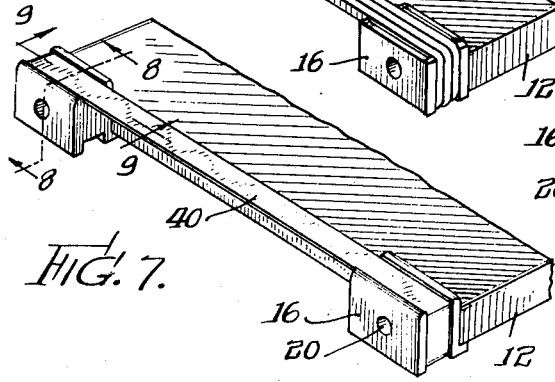
INVENTOR.
James J. Gough
BY Cox & Moore
ATTORNEYS.

Patented June 11, 1940

2,204,212

UNITED STATES PATENT OFFICE 2,204,212

HANDLE AND BASE CONSTRUCTION FOR AN ELECTRICAL APPLIANCE

James J. Gough, Chicago, Ill., assignor to Chicago Electric Manufacturing Company, Chicago, Ill., a corporation of Illinois Application April 24, 1939, Serial No. 269,637

7 Claims. (Cl. 65—53)

The present invention relates to a supporting base or tray construction and particularly to a manual handle construction permitting manipulation of the tray or supporting base.

The present invention more particularly contemplates provision of a handle construction for the base of an electrical appliance, which handle is adapted for association with a base of substantially any desired configuration and which comprises an elongated member or members located in spaced relationship to the base and conveniently manually accessible to render the appliance portable.

It is an object of the present invention to provide a handle and base construction comprising elongated handle means arranged above and operatively associated with the base through the agency of supporting members which are preferably resistant to the passage of heat so that the portions adapted for manual engagement will be retained in comfortably cool condition at all times, even when employed in conjunction with an appliance of the type which liberates heat to the base.

Another object of the present invention is to provide a handle construction of the foregoing character comprising a unit having a pair of spaced supporting blocks adapted for permanent assembly upon the base and comprising suitable resilient elongated means connecting the blocks.

Among other important objects of the present invention is to provide a unitary block and elongated handle construction as recited immediately above wherein the elongated handle portion substantially embraces a pair of blocks for providing a unitary structural interengagement of the parts comprising the handle unit and thereby permitting securement of the handle upon the base by means of a minimum number of fastening means; and to provide a handle construction as above wherein portions of the block extend below the base of the appliance to provide supporting foot portions spacing the base desirably from a supporting surface.

Yet other objects of the present invention will be apparent from a consideration of the following specifications and drawings wherein preferred embodiments of the present invention are described in detail for the purpose of illustrating the present invention.

Referring to the drawing:

Figure 1 is a perspective view of a supporting base and handle construction for an electrical appliance, the appliance per se comprising a waffle iron represented in dotted lines.

Figure 2 is a sectional view taken transversely through Fig. 1 on a line 2—2 thereof.

Figure 3 is a detailed sectional view of one extremity of the handle construction taken on line 3—3 in Fig. 1.

Figure 4 is a detailed perspective view showing an alternative modified preferred form of handle construction.

Figure 5 is a sectional detailed view taken on a line 5—5 in Fig. 4.

Fig. 6 is a detailed sectional view taken on a line 6—6 of Fig. 4.

Figure 7 is a perspective view showing a yet further modified form of handle construction in accordance with the present invention.

Figures 8 and 9 are detailed sectional views taken on lines 8—8 and 9—9, respectively, of Figure 7.

Referring to the figures of the drawing wherein the present invention is illustrated more in detail:

Figs. 1 to 3, inclusive, show a supporting base construction for an electrical appliance. The specific construction of the appliance itself forms no part of the present invention and, therefore, it is represented by the dotted lines. The supporting base for the appliance consists of a flat sheet of material 10 having a rectangular form and provided along its four sides with downwardly projecting flanges 12. It will thus be noted that the base is of extremely simple configuration capable of being configurated by rapid and inexpensive operations. The top surface of the wall 10 is provided with any conventional mounting or supporting means 14 for accommodating the appliance.

The handle construction includes a pair of blocks 16 of general prismatic, rectangular form. As clearly shown in Fig. 1, each pair of the blocks 16 is arranged in alinement adjacent a side edge of the base, each block being fastened against a side flange 12 by a machine screw and nut 18. As clearly shown in Fig. 2, the blocks are counter-bored 20 to accommodate the head of the fastener.

Extending between each pair of blocks 16 are a plurality of elongated members 22 which in the present embodiment take the form of relatively narrow cylindrical bars or wires. In order to accommodate these bars it will be noted that the opposed faces of the block 16 are bored as at 24, to snugly receive the ends of these members, the bored recesses facing or opening toward the central portion of the adjacent side flange.

From the foregoing, it will be apparent that when the elongated members 22 are arranged with their extremities engaged within the recesses 24 and the blocks bolted to the adjacent side flange 12 there is provided a permanent handle construction of great strength and utility. It is important to note that the recesses 24 are so arranged that the elongated bars 22 are supported adjacent or above the top surface 10 of the base, thus facilitating manual engagement.

It should be further noted that the blocks 16 extend downwardly below the flanges 12 to provide foot portions and since the blocks are arranged adjacent each of the four corners of the base, it will be seen that there is provided a quite stable supporting construction for retaining the base out of contact with the supporting surface.

A decorative fluting effect 26 formed on the top surfaces of the block 16 is shown in the figures, although the present invention is not limited to any particular configuration of the blocks which may be varied widely in shape or decorative appearance.

There is shown in Figs. 3 and 4, inclusive, a further modified form of handle construction wherein the plurality of elongated members at least partially embrace the corner supporting block construction. To this end, as more clearly shown in Figs. 5 and 6, the blocks 16 are each provided with a channel or recess which extends continuously along the top and bottom and the outer end surfaces of each block. That is to say, each block 16 is provided longitudinally of its upper and lower surfaces with recessed channels 28 and 30, respectively, which extend in a direction parallel to the side flange 12 upon which the block is mounted and are defined by upstanding flanges or walls 32. A similar groove or channel 34 extends vertically along one end wall of the block to join the channels 28 and 30, as shown in Fig. 6. The purpose of this continuous channel configuration is to accommodate the extremities of the plurality of elongated members 22 which are arranged therein, as clearly shown in Fig. 4. More particularly the bars 22 reside in the upper channel 28 as shown in Figs. 5 and 6 and then are bent downwardly as at 36 to reside in the vertical channel 34, being subsequently bent reversely inwardly at their extremities to form arms 38 which reside in the lower channel 30 and thus more or less firmly embrace the block.

It will be evident that this means of interconnection prevents lateral displacement of the parts and that when the blocks are mounted upon the adjacent flange as through the agency of the machine bolt 18 relative longitudinal displacement is likewise prevented. The resulting construction provides a permanent construction of great simplicity and pleasing appearance.

It should be particularly noted that the lowermost groove or channel 30 is slightly deeper than the channels 28 and 34 so that the extremities 38 of the elongated bars will clear the supporting surface. On the other hand, the configuration of the grooves 28 and 34 is such that the outer surfaces of the elongated members reside substantially flush with the adjacent outer surface portion of the block giving a pleasing appearance to the entire construction.

A yet further modified embodiment is disclosed in Figs. 7 to 9, inclusive, and it differs primarily from the embodiment just previously described in that a flat elongated strip 40 is substituted for the cylindrical elongated bars hitherto described. The strip 40 seats within channels or grooves 28, 30 and 34, as hereinbefore mentioned, the extremities of the flat stock being formed about the block in identically the same manner as the foregoing embodiment.

It should be further noted that each of the supporting blocks 16 provided in accordance with the present embodiment are possessed of a laterally extending ledge or projection 42 adjacent their lower edge. The projection 42 as shown in Fig. 8 extends inwardly just beneath the flange 16 and may serve to vertically position the block with respect to the flange. Attention is particularly directed to the fact, however, that the ledge or projection 42 may be, and preferably is, eliminated in many cases. Thus, for example, where the elongated members are characterized by some desirable resilience there may be a tendency for the blocks to pivot slightly as the manually engageable portions are flexed during lifting. However minute this degree of pivoting, it will be seen that the resulting structural elasticity contributes materially to the permanence and serviceability of the present device.

The present invention provides a supporting base and handle construction which greatly simplifies fabrication and assembly. It will be obvious from the foregoing that the elongated manually engageable portion of the handle is so spaced with respect to the adjacent portions of the appliance and the base as to be effectively heat insulating and accordingly rendering the handle particularly desirable for application to waffle irons or other heated appliances. To this end blocks 16 are preferably composed of some suitable non-conducting material such as wood.

It will be understood that changes may be made in the form of construction and arrangement of parts without departing from the spirit of the invention or sacrificing any of its advantages, the foregoing preferred construction having been disclosed merely for illustrative purposes to enable one skilled in the art readily to comprehend the nature of the invention. The right is therefore reserved to make all such changes as fairly fall within the scope of the following claims.

The invention is hereby claimed as follows:

1. In an appliance of the class described, a base plate for supporting the appliance and having a flange extending adjacent a side margin thereof, a handle construction secured to said flange, said handle construction comprising a pair of alined supporting blocks fixed to said flange and an elongated member supported by said blocks, said blocks having alined peripheral channels along their upper surfaces, and being disposed in spaced relationship to the base, said channels extending substantially about the periphery of each block, and said elongated member extending between the upper portions of said alined blocks and having its extremities residing in said channels and reversely embracing the blocks.

2. In an appliance of the class described, a base plate for supporting the appliance and having a flange extending adjacent a side margin thereof, a handle construction secured to said flange, said handle construction comprising a pair of alined supporting blocks fixed to said flange and an elongated member supported by said blocks, said blocks having alined peripheral channels along their upper surfaces, and being disposed in spaced relationship to the base, said channels extending substantially about the periphery of each block, and said elongated member extending between the upper portions of said alined blocks and having its extremities residing in said channels, said extremities being formed about and substantially embracing said blocks, whereby to support said elongated member in spaced relationship with respect to the base.

3. In an appliance of the class described, a base plate for supporting the appliance and having a flange extending adjacent a side margin thereof, a handle construction secured to said flange, said handle construction comprising a pair of spaced blocks mounted upon said flange and having at least one elongated member providing a manually engageable portion extending between said blocks and in spaced relation to said flange, each of said blocks having a recess formed in one side face thereof, said recesses being located intermediate of opposed side edges of said face and extending inwardly from said face a distance short of the opposed side face of the block, whereby to provide a blind recess facing outwardly at said first-named side face, and said elongated member having its opposite extremities substantially freely engaged within said blind recesses to mount the elongated member permanently upon said blocks.

4. In an appliance of the class described, a base plate of sheet material for supporting the appliance and having a vertical flange extending adjacent a side margin thereof, a handle construction secured to said flange, said handle construction comprising a pair of spaced blocks mounted upon said flange and having at least one elongated member providing a manually engageable portion extending between said blocks and in spaced relation to said flange, each of said blocks having a recess formed in one side face thereof, said recesses being located intermediate of opposed side edges of said face and comprising apertures sectionally complementary to the sectional shape of said elongated members and extending inwardly from said face a distance short of the opposed side face of the block, whereby to provide a blind recess facing outwardly at said first-named side face, said elongated member having its extremities residing freely within said recesses and longitudinally thereof, and said blocks being mounted and arranged with said recesses oppositely facing, whereby said elongated member is positively located and supported.

5. A supporting base and handle construction for an appliance of the class described, said base having a laterally extending surface along one side edge thereof, a pair of spaced supporting blocks fixed to said surface and projecting outwardly therefrom, an elongated member supported by said blocks and extending in spaced relation to said surface, said blocks having aligned peripheral channels along their peripheral surfaces and in spaced relationship to said surface, said channels extending reversely about the said periphery of each block, and said elongated member extending between the upper portions of the aligned blocks and having its extremities extending into channels and reversely embracing the blocks for permanently mounting the elongated member in operative position.

6. A supporting base and handle construction for an appliance of the class described, said base having a laterally extending surface along one side edge thereof, a pair of spaced supporting blocks fixed to said surface and projecting outwardly therefrom, an elongated member supported by said blocks and extending in spaced relation to said surface, said blocks having aligned peripheral channels along their peripheral surfaces and in spaced relationship to said surface, said channels extending reversely about the said periphery of each block, said elongated member extending between the upper portions of the aligned blocks and having its extremities extending into channels and reversely embracing the blocks for permanently mounting the elongated member in operative position, and said blocks having a laterally extending shoulder extending inwardly and beneath said base and longitudinally of said edge for fixedly locating said blocks with respect to said surface against rotational displacement.

7. In an appliance of the class described, a base plate for supporting the appliance and having a flange adjacent a side margin thereof, a handle construction secured to said flange, said handle construction comprising an elongated manually engageable member located in spaced relation to said flange, a pair of blocks for supporting said elongated member, each of said blocks having a recess extending only partially through the block from a side face thereof, the opposed extremities of said elongated member residing freely within the recesses, and said blocks being fixed to said flange in spaced relationship with the recesses oppositely facing for permanently retaining said elongated member therewithin.

JAMES J. GOUGH.